United States Patent
Hong et al.

(10) Patent No.: US 7,001,466 B2
(45) Date of Patent: Feb. 21, 2006

(54) SYSTEMS AND METHODS FOR AUTOMATIC AND CONTINUOUS COATING SUPPLY DURING OPTICAL FIBER PRODUCTION

(75) Inventors: Siu-Ping Hong, Alpharetta, GA (US); Jason W. Shiroishi, Decatur, GA (US); James A. Hudson, Norcross, GA (US)

(73) Assignee: Fitel USA Corp., Norcross, GA (US)

( * ) Notice: Subject to any disclaimer, the term of this patent is extended or adjusted under 35 U.S.C. 154(b) by 214 days.

(21) Appl. No.: 10/326,475

(22) Filed: Dec. 20, 2002

(65) Prior Publication Data

US 2004/0120671 A1 Jun. 24, 2004

(51) Int. Cl.
*B05C 11/10* (2006.01)

(52) U.S. Cl. ............... 118/685; 118/684; 118/679; 137/208; 137/209; 222/64; 222/52; 222/334

(58) Field of Classification Search ........ 118/692–695, 118/684, 679, 300, 685; 222/52, 64, 66, 222/135, 334, 389, 386.5; 137/203, 209
See application file for complete search history.

(56) References Cited

U.S. PATENT DOCUMENTS

| | | | |
|---|---|---|---|
| 4,246,299 A | | 1/1981 | Ohls |
| 4,616,978 A | * | 10/1986 | Matheson et al. ............. 417/2 |
| 5,435,462 A | * | 7/1995 | Fujii ............................ 222/82 |
| 5,636,762 A | * | 6/1997 | Juhola et al. ................. 222/1 |
| 5,828,448 A | | 10/1998 | Jakobsen et al. |
| 5,868,278 A | * | 2/1999 | Chen ............................ 222/1 |
| 6,204,304 B1 | | 3/2001 | Houlihan et al. |
| 6,817,486 B1 | * | 11/2004 | Yang ............................ 222/55 |

* cited by examiner

*Primary Examiner*—George Koch
(74) *Attorney, Agent, or Firm*—Sutherland Asbill & Brennan LLP

(57) ABSTRACT

Systems and methods are disclosed for an automatic and continuous supply of coating material to a coating applicator in optical fiber fabrication. The present invention switches from one coating reservoir to another by way of a transitional period in which both coating reservoirs are supplying coating material to the coating applicator. For example, while an in-use reservoir is supplying the coating material to the coating applicator, a standby reservoir is being filled, settled to off gas air bubbles and then slowly pressurized. A sized orifice is used to slowly bleed off pressure from the in-use reservoir at a rate that does not allow the pressure in the in-use reservoir from falling out of a desired pressure range. When the in-use reservoir is substantially emptied of coating material and the pressures in both reservoirs are substantially equalized, then both reservoirs simultaneously supply coating material to the coating applicator for a period of time before switching completely over to the standby reservoir.

13 Claims, 2 Drawing Sheets

SYSTEMS AND METHODS FOR AUTOMATIC AND CONTINUOUS COATING SUPPLY DURING OPTICAL FIBER PRODUCTION

BACKGROUND OF THE INVENTION

I. Field of the Invention

The present invention relates generally to optical fiber, and more particularly to supplying coating material to a coating applicator in the fabrication of optical fiber.

II. Description of Related Art

Methods for the manufacture of optical fibers by drawing the fiber from a glass preform and coating the fiber with a liquid polymer immediately after drawing are well known. The polymer coating serves as a protective coating to prevent airborne particles from impinging upon and adhering to the surface of the drawn fiber, which would mechanically weaken the fiber or even affect its transmission properties. Also, the coating shields the fibers from surface abrasion, which could occur as a result of subsequent manufacturing processes and/or handling during installation. The coating also provides protection from corrosive environments and spaces the fibers in cable structures.

Optical fibers are coated with the liquid polymer coating material by a process which typically involves passing the fiber through an applicator having a coating die that defines a small, vertically orientated, longitudinal tapered passage. The coating material is injected under pressure into the coating applicator so that the coating material is applied uniformly about the fiber at a predetermined thickness. The coating material is cured or otherwise solidified to allow the fiber to be reeled for further processing or storage. The cure mechanism predominantly used in commercial practice with liquid polymer coatings is UV induced polymerization. It is common to apply only a single coating to the fiber or to apply two coatings either sequentially or simultaneously (typically referred to as the primary and secondary coatings).

With recent emphasis on increasing fiber draw efficiency, larger performs are being utilized so that the draw process can produce continuous fiber of greater lengths without having to stop the process to load a new perform. It is known that stopping the draw process results in reduced yield, increased down time and an increase in wasted materials (e.g., glass and coating material).

In many fiber manufacturing processes, the coating is supplied in batch, from a reservoir having a limited amount of coating material. The capacity of the these reservoirs was determined based upon the preform size at the time the drawing system was designed and built. Because of concerns for space efficiency and cost, the reservoirs were originally designed to hold only enough material to cover the fiber drawn in a single run from a single perform of the size known at that time. Because some reservoirs require a settling period of at least several hours once filled to allow any air bubbles in the coating material to rise to the surface and be released (referred to as off gassing), many draw systems incorporated two reservoirs for each coating (e.g., two reservoirs for the primary and two reservoirs for the secondary) so that the reservoirs can be switched when a new perform is loaded. Thus, when a glass perform is exhausted and the drawing process is stopped to load a new perform, the reservoir supplying the coating material is switched. The switch is typically made by selectively opening and closing the appropriate valves to and from the full reservoir the empty reservoir. For those coating applications which do not use gravity to feed the coating material to the coating die, the appropriate valves are opened and closed so that the desired amount of air pressure is applied to the full reservoir to force the coating material through a series of conduits to the coating applicator at a precise pressure. The drawing process then starts drawing fiber from the new perform which is coated by coating material supplied by the full reservoir. The empty reservoir is then filled and off gassed during a settling period while the other reservoir supplies the coating material.

With the increase in preform size, existing reservoirs are not able to provide enough coating material for a complete run of a single preform. Thus, since the reservoirs typically operate independently of one another, once the reservoir supplying the coating has been emptied, the draw process is stopped to switch to the other reservoir which has been filled and off gassed. This results in wasted materials (e.g., glass and coating material) as well as additional down time. Accordingly, it has been recognized that the fiber draw capacity is bounded by the size of the coating reservoir in use.

One proposed solution is to increase the reservoir size. While possibly a viable solution for new fiber draw towers to be built, this generally is not a practical solution for existing draw towers. The addition of larger reservoirs would require additional space, and may require modifications to the piping and other equipment located near the reservoir location. In addition, new reservoirs would have to be purchased and installed, which would be costly, especially with systems that fabricate dual coated fibers (thereby requiring four or more reservoirs per tower). Furthermore, this modification would only last until preform technology again surpasses coating capacity.

Thus, there exists a unsatisfied need in the industry for a cost effective solution for increasing the amount of coating material that can be continuously supplied during the fabrication of optical fiber.

SUMMARY OF THE INVENTION

The present invention provides systems and methods for the automatic and continuous supply of coating material to the coating applicator. The present invention achieves this, at least in part, by switching from one coating reservoir to another by way of a transitional period in which both coating reservoirs are supplying coating material to the coating applicator. The coating reservoirs share a vent line(s), which is used to slowly pressurize the standby reservoir after it has been filled, thereby preventing the air pressure to the in-use coating reservoir from dropping an undesirable amount. Once pressurized, the standby coating reservoir can begin supplying coating material once the amount of coating material in the in-use coating reservoir drops below a predetermined level. During a transition period, both reservoirs supply coating material, which is possible because of the prior pressurization of the standby coating reservoir. After a short transition period, the empty coating reservoir stops supply coating material so that it can be refilled and off gassed.

By providing a continuous coating supply, the present invention advantageously removes a significant roadblock to reducing costs and increasing yields, that being the stopping of the fiber draw process to switch coating reservoirs. In addition, the present invention provides a cost effective solution requiring only minimal modifications to existing coating supply systems utilizing two reservoirs per coating.

In accordance with an embodiment of the present invention, a coating supply system for providing coating material to a coating applicator in the manufacture of optical fiber comprises at least a first coating reservoir and a second coating reservoir, both of which are selectively coupled to the coating applicator, a pressurized air source that provides high pressure air, wherein the air source is selectively coupled to the first and second coating reservoirs, and a sized orifice that selectively allows the pressurization of one of the first and second coating reservoirs at a predetermined rate using the pressurized air from the pressurized air source while the other of the first and second coating reservoirs is supplying coating material to the coating applicator. In this embodiment, the first and second coating reservoirs can be selectively coupled to the coating applicator by respective first valves, and the pressurized air source is selectively coupled to the first and second coating reservoirs by respective second valves, and the pressurized air source is selectively coupled to the first and second coating reservoirs through the sized orifice by a third valve. Whether valves or other suitable devices are utilized in accordance with the present invention to control the flow of pressurized air and coating material, said devices are selectively controlled by a controller, such as one that comprises a computer processor.

In accordance with another embodiment of the present invention, a method for supplying coating material to a coating applicator in the manufacture of optical fiber comprises the steps of providing at least a first coating reservoir and a second coating reservoir, both of which are selectively coupled to the coating applicator, providing a pressurized air source that provides high pressure air, wherein the air source is selectively coupled to the first and second coating reservoirs, supplying coating material from the first coating reservoir to the coating applicator, filling the second coating reservoir with coating material and then equalizing the pressure in the first and second coating reservoirs at a predetermined pressure, and transitioning the supply of coating material delivered to the coating applicator from the first coating reservoir to the second coating reservoir by supplying coating material from both the first and second coating reservoirs simultaneously for a period of time before supply coating material from just the second coating reservoir. In this embodiment of the present invention, a further step comprises off gassing the second coating reservoir when the second coating reservoir is filled with coating material. When equalizing the pressure in the first and second coating reservoirs, the second coating reservoir is slowly pressurized with pressurized air from the pressurized air source. Preferably, the pressure is equalized without allowing the pressure in the first coating reservoir from dropping an amount that would adversely affect the optical fiber yield.

In the above method, the steps of supplying the coating material, filling the second coating reservoir and transitioning the supply of coating material are controlled with at least a plurality of valves controlled by a computer processor-based controller. In addition, the step of supply coating material from the first coating reservoir may include applying air pressure from the air pressurized air source, and wherein equalizing the pressure in the first and second coating reservoirs includes slowly pressurizing the second coating reservoir with pressurized air from the pressurized air source so that the air pressure in the first coating reservoir does not fall out of a predetermined range.

In accordance with yet another embodiment of the present invention, a coating supply system for providing coating material to a coating applicator in the manufacture of optical fiber comprises at least a first coating reservoir and a second coating reservoir, both of which are selectively coupled to the coating applicator, pressurized air source that provides high pressure air, the air source being selectively coupled to the first and second coating reservoirs, and means for selectively allowing the pressurization of one of the first and second coating reservoirs at a predetermined rate using the pressurized air from the pressurized air source while the other of the first and second coating reservoirs is supplying coating material to the coating applicator.

In accordance with yet another embodiment of the present invention, an optical fiber can be fabricated by a process comprising the steps of providing a continuous optical fiber drawn from a single fiber preform, and coating the fiber with at least one continuous layer of a coating material, wherein the coating material is supplied from at least two different coating reservoirs in succession. The transition from one reservoir to another may comprise a transition period in which both reservoirs supply coating material simultaneously. In addition, a second layer of coating material can be applied to the fiber, wherein the coating material for the second layer is also supplied from two different coating reservoirs in succession.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is disclosed below in the context of a single coating system, though it will be appreciated by those skilled in the art that the present invention is equally applicable to dual coating systems which have two coating supply systems that are substantially identical (e.g., one for the primary coating and one for the secondary coating). Yet further, the present invention can be utilized in coating supply systems used in the fabrication of a fiber matrix, as well as any other coating supply system.

Figure 1:
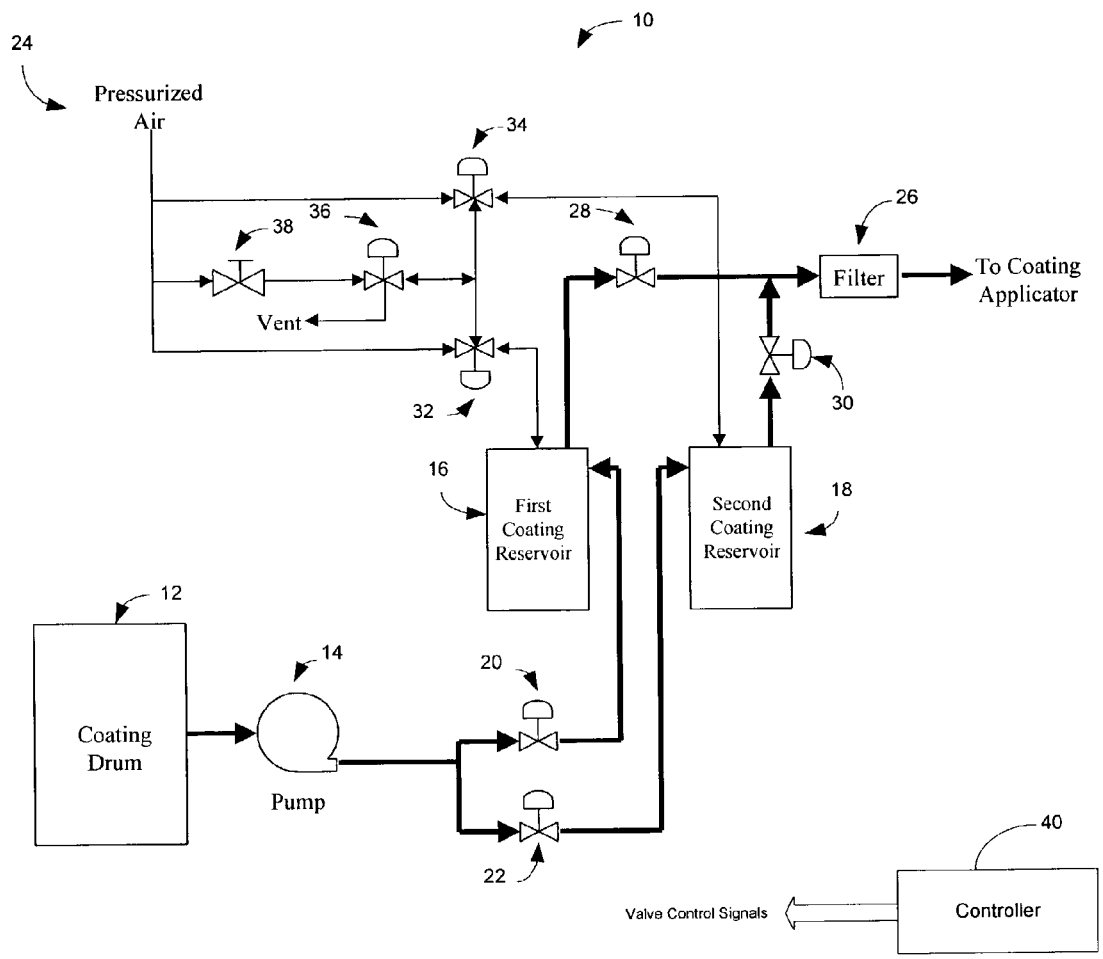
FIG. 1 is a schematic block diagram illustrating a coating system in accordance with an embodiment of the present invention.

With reference to the figures, FIG. 1 shows an illustrative coating supply system 10 in accordance with an embodiment of the present invention. The coating supply system 10 includes a coating drum 12 that contains the coating material to be applied to the fiber, which typically is a liquid polymer material though other suitable materials may be used. A pump 14, such as a diaphragm pump, pumps the coating material from the primary coating drum 12 to a first coating reservoir 16 and a second coating reservoir 18. It is noted for purposes of clarity, that the flow of the coating material is denoted by bold lines in FIG. 1. The flow of coating material from the primary coating drum 12 to the first and second coating reservoirs 16, 18 is at least partially controlled by valves 20 and 22, respectively. Air pressure from a pressurized air source 24 is utilized to force the coating material from the first coating reservoir 16 and/or the second coating reservoir 18 to the coating applicator (not shown). The coating material supplied to the coating applicator passes through a filter 26, which removes particulate contaminants in the coating material. An example of a suitable filter is Model U2-20Z by Pall Corporation, East Hill, N.Y. Valves 28 and 30 control the flow of coating material from the first coating reservoir 16 and the second coating reservoir 18, respectively.

The pressurized air source 24 supplies high-pressure compressed dry air (HPCDA) at a predetermined pressure to the first coating reservoir 16 and the second coating reservoir 18 via valves 32 and 34, respectively. It is noted for purposes of clarity that the flow of pressured air is denoted by relatively thin lines in FIG. 1. In the present embodiment, the valves 32 and 34 are 3-way valves designed to allow each coating reservoir 16, 18 to independently vent through a vent valve 36 while the respective reservoir is being filled with coating material from the coating drum 12. In addition, a sized orifice 38, as may be achieved by the use of a sized orifice or a ball valve set to a predetermined orifice size, is provided between the pressurized air source 24 and the vent valve 36 to provide slow pressurization of the standby coating reservoir via valve 36 while the in-use coating reservoir supplies coating material to the coating applicator. It is noted that the vent valve 36 and sized orifice 38 can be integrally formed into a single valve, if desired.

A control system 40 is in communication with and controls the actuation of valves 20, 22, 28, 30, 32, 34, and 36 in accordance with the present invention. The valves preferably are pneumatically operated, though other suitable valves may be used. The control system 40 preferably comprises a computer-based system programmed with the appropriate logic to independently actuate the valves, though other suitable systems may be used.

In normal operation, valves 28 and 32 are actuated (i.e., opened) allowing HPCDA to flow to the first coating reservoir 16, which causes coating material to flow through filter 26 to the coating applicator. The three-way valves 34 and 36 are closed to prevent passage of HPCDA from the pressurized air source 24, though they are opened to allow venting from the second coating reservoir 18 through vent valve 36. In addition, the valve 30 is closed to prevent the flow of coating material from the second reservoir to the coating applicator. This allows equalization of the pressure in the second reservoir 18 with the atmospheric pressure.

The second coating reservoir is then filled with coating material from the coating drum 12 by actuating the pump 14 and opening valve 22. It is noted that the volume of coating material in the reservoirs 16, 18 can be monitored by several different means, though the present embodiment utilizes a scale underneath the reservoirs that measures the weight of the reservoir, which can be correlated to the volume of coating material in the reservoir. Once a desired amount of coating material has been added to the second coating reservoir, the pump 14 is cut off and the valve 22 is closed. The coating material in second coating reservoir is then allowed to settle for a sufficient time to allow the air bubbles in the coating material to off gas.

The vent valve 36 is actuated to close off the vent and to allow the pressurized air from the sized orifice 38 to slowly pressurize the second coating reservoir 18 through valve 34. In the disclosed embodiment, a manual ball valve 38 acts as a flow restrictor that limits the pressure drop in the first coating reservoir 16 while air is slowly bled off to equalize the pressure in the first and second coating reservoirs 16, 18. In most coating supply systems it is important to maintain a precise and consistent pressure forcing the flow of the coating material to the coating applicator because small variations in the pressure may result in variations in the thickness of the coating. By slowly pressuring the second coating reservoir 18, the pressure drop in the first coating reservoir 16 can be minimized so as to stay within a desired range.

After the pressures in the two reservoirs 16, 18 are substantially equalized, the coating system is ready to transition from the first coating reservoir 16 to the second coating reservoir 18. The transition is typically triggered by the volume of coating material in the first reservoir 16 reaching a predetermined minimum (as preferably determined by the weight of the reservoir). In the transition, reservoir 18, having been previously equalized with reservoir 16, is put under normal pressure control by positioning valve 34 to allow pressurized air 24 to supply it directly. Valve 30 is then actuated to allow coating material to flow from the second coating reservoir through the filter 26 to the coating applicator. Thus, both reservoirs 16, 18 are simultaneously supplying coating material to the coating applicator for a predetermined time, preferably long enough to ensure steady state operation of the system. In the disclosed embodiment, this takes approximately 30 seconds to two minutes, though it will be appreciated by those of skill in the art that both reservoirs can simultaneously supply the coating material for less than 30 seconds or more than two minutes, as may be desired. The valves 28 and 32 are then closed to stop the flow of coating material from the first coating reservoir 16 to the coating applicator and to stop the flow of pressurized air from pressurized air source 24 into the first coating reservoir 16, respectively. The position of valve 32 allows the venting of the first coating reservoir 16 through the vent valve 36, which is actuated to stop the flow of pressurized air into the first reservoir 16 and to allow the venting of the first reservoir 16.

While the second reservoir supplies the coating material to the coating applicator, the first reservoir is filled with coating material from the coating drum 12, and the coating material in the first coating reservoir 16 is settled. When reservoir 18 becomes sufficiently low to trigger a switch the first coating reservoir 16 is slowly pressurized in substantially the same manner as described above with reference to the second coating reservoir 18. The supply system 10 can then transition from the second coating reservoir 18 back to the first coating reservoir 16 when desired by supplying coating material from both reservoirs 16, 18 for a short period of time before stopping the flow of coating material from the second reservoir 18. In a similar fashion, the supply of coating material can be switched between the two reservoirs an essentially endless number of times without having to stop the fiber draw run.

Figure 2:
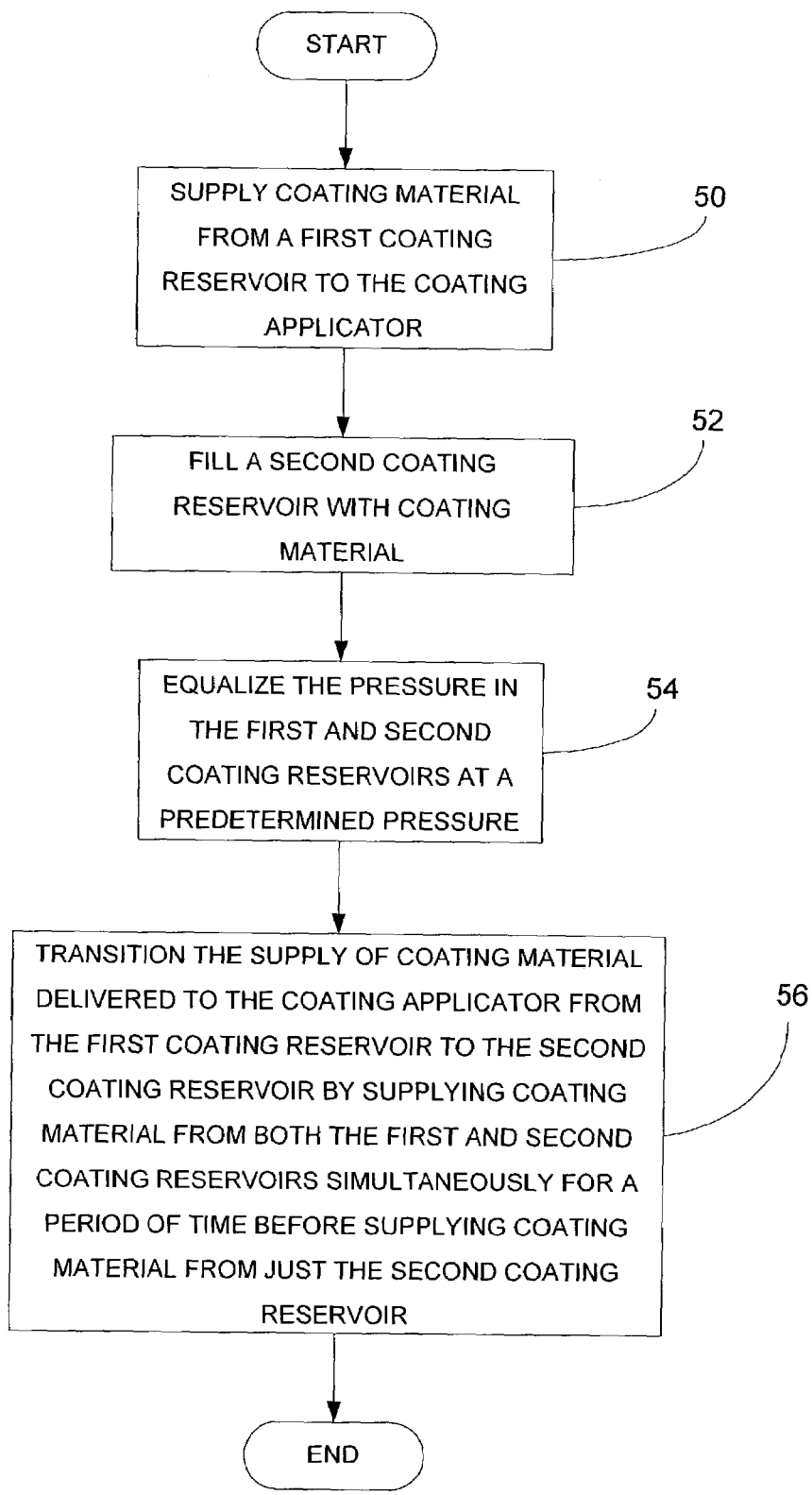
FIG. 2 is a flowchart of a coating supply process in accordance with an embodiment of the present invention.

With reference to FIG. 2, an illustrative method for supplying coating material to a coating applicator in the manufacture of optical fiber in accordance with the present invention is disclosed. It will be appreciated that the present method assumes the presence of at least a first coating reservoir and a second coating reservoir, both of which are selectively coupled to the coating applicator, and a pressurized air source that provides high pressure air, wherein the air source is selectively coupled to the first and second coating reservoirs. While the present invention is disclosed in the context of an in-use reservoir and a standby reservoir, the present invention can be readily applied to coating systems with more than two reservoirs for a single fiber tower.

Initially, the coating material is supplied from the first coating reservoir to the coating applicator, as indicated by block 50. The second coating reservoir is filled with coating material, as indicated by block 52, and then pressure is equalized in the first and second coating reservoirs at a predetermined pressure, as indicated by block 54. Using a sized orifice, air pressure can be bled from that used to pressurize the first coating reservoir without letting the pressure in the first coating reservoir 16 from falling outside a desirable range, for example, ±5 pounds/square inch. Next, the supply of coating material delivered to the applicator is transitioned from the first coating reservoir to the second coating reservoir by supplying coating material from both the first and second coating reservoirs simultaneously for a period of time before supply coating material from just the second coating reservoir, as indicated by block 56. After a short transition period, the flow of coating material from first reservoir is stopped so that it can be refilled, off gassed and pressurized in substantially the same manner as described above with connection to the second coating reservoir.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A coating supply system for providing coating material to a coating applicator in the manufacture of optical fiber, comprising:
   at least a first coating reservoir and a second coating reservoir, both of which can be selectively coupled to the coating applicator;
   a pressurized air source that provides high pressure air, wherein the air source can be selectively coupled to one or both of the first and second coating reservoirs;
   a sized orifice that selectively provides the pressurization of one of the first and second coating reservoirs at a predetermined rate using the pressurized air from the pressurized air source while the other of the first and second coating reservoirs is supplying coating material to the coating applicator; and
   wherein the pressurized air source can be selectively coupled to one or both of the first and second coating reservoirs by at least a first valve and a second valve, respectively, and by at least the sized orifice in series with a third valve.

2. The system of claim 1, wherein the first, second and third valves are selectively controlled by a controller.

3. The system of claim 2, wherein the controller comprises a computer processor.

4. The system of claim 1, wherein the sized orifice and the third valve are integral one another.

5. The system of claim 4, wherein the third valve is coupled to the first and second coating reservoirs by the respective first and second valves.

6. The system of claim 1, wherein the coating material is applied to the optical fiber as a primary coating.

7. The system of claim 1, wherein the coating material is applied to the optical fiber as a secondary coating.

8. A coating supply system for providing coating material to a coating applicator in the manufacture of optical fiber, comprising:
   at least a first coating reservoir and a second coating reservoir, both of which can be selectively coupled to the coating applicator;
   a pressurized air source that provides high pressure air, wherein the air source can selectively coupled to one or both of the first and second coating reservoirs;
   means for selectively providing the pressurization to one of the first and second coating reservoirs at a predetermined rate using the pressurized air from the pressurized air source while the other of the first and second coating reservoirs is supplying coating material to the coating applicator; and
   wherein the pressurized air source can be selectively coupled to one or both of the first and second coating reservoirs by at least a first valve and a second valve, respectively, and by at least a third valve in series with a sized orifice, and wherein a controller selectively controls the first, second and third valves.

9. The system of claim 8, wherein the controller comprises a computer processor.

10. The system of claim 8, wherein the sized orifice and the third valve are integral one another.

11. The system of claim 10, wherein the third valve is coupled to the first and second coating reservoirs by the respective first and second valves.

12. The system of claim 8, wherein the coating material is applied to the optical fiber as a primary coating.

13. The system of claim 8, wherein the coating material is applied to the optical fiber as a secondary coating.

* * * * *